United States Patent [19]

Kaplinsky

[11] Patent Number: 5,455,923
[45] Date of Patent: Oct. 3, 1995

[54] MEMORY SYSTEM FOR LOADING PERIPHERALS ON POWER UP

[76] Inventor: Cecil H. Kaplinsky, 140 Melville Ave., Palo Alto, Calif. 94301

[21] Appl. No.: 4,797

[22] Filed: Jan. 14, 1993

Related U.S. Application Data

[63] Continuation-in-part of Ser. No. 923,315, Jul. 30, 1992, abandoned.

[51] Int. Cl.$^6$ ................................................. G06F 13/12
[52] U.S. Cl. ............................................ 395/481; 395/775
[58] Field of Search ..................................... 395/775, 425

[56] References Cited

U.S. PATENT DOCUMENTS

| | | | |
|---|---|---|---|
| 4,030,073 | 6/1977 | Armstrong et al. | 395/775 |
| 4,222,491 | 9/1980 | Geppert | 212/153 |
| 4,245,302 | 1/1981 | Amdahl | 395/375 |
| 4,410,962 | 10/1983 | Daniels et al. | 395/500 |
| 4,430,704 | 2/1984 | Page et al. | 395/700 |
| 4,516,199 | 5/1985 | Frieder et al. | 395/275 |
| 4,535,421 | 8/1985 | Duwel et al. | 395/250 |
| 4,589,063 | 5/1986 | Shah et al. | 395/275 |
| 4,716,523 | 12/1987 | Burrus, Jr. et al. | 395/425 |
| 4,747,139 | 5/1988 | Taaffe | 380/44 |
| 4,791,384 | 12/1988 | Mackey et al. | 364/718 |
| 4,808,803 | 2/1989 | Magier et al. | 235/382 |
| 4,882,711 | 11/1989 | Guillot | 365/229 |
| 4,899,272 | 2/1990 | Fung et al. | 365/230.03 |
| 4,937,777 | 6/1990 | Flood et al. | 395/325 |
| 4,942,606 | 7/1990 | Kaiser et al. | 380/4 |
| 4,959,860 | 9/1990 | Watters et al. | 380/4 |
| 4,999,838 | 3/1991 | Horikawa | 371/16.1 |
| 5,012,514 | 4/1991 | Renton | 380/4 |
| 5,021,963 | 6/1991 | Brown et al. | 364/464.02 |
| 5,038,320 | 8/1991 | Heath et al. | 395/275 |
| 5,050,213 | 9/1991 | Shear | 380/25 |
| 5,111,425 | 5/1992 | Takeuchi et al. | 395/425 |
| 5,179,663 | 1/1993 | Iimura | 395/250 |
| 5,202,997 | 4/1993 | Arato | 395/725 |

(List continued on next page.)

OTHER PUBLICATIONS

D. J. Comer, "Digital System Design: State Machine Versus Microprocessor Controller", IEEE Transactions on Education, vol. E–30 No. 2, May 1987, pp. 102–106.

D. Snyers et al., "Algorithmic State Machine Design and Automatic Theorem Proving: Two Dual Approaches to the Same Activity", IEEE Transactions on Computers, vol. C–35, No. 10, Oct. 1986, pp. 853–861.

P. Asham et al., "Optimum and Heuristic Algorithms for an Approach to Finite State Machine Decomposition", IEEE Transactions on Computer–Aided Design, vol. 10, No. 3, Mar. 1991, pp. 296–310.

"Section 2—Inter–Integrated (I$^2$C) Circuit Bus," *80C51–Based 8–Bit Microcontrollers*, Signetics Company, Feb. 1992, pp. 134–156.

"Section 1—80C51 Family," *80C51–Based 8–Bit Microcontrollers*, Signetics Company, Feb. 1992, pp. 31–37.

"XC1736A/XC1765 Serial Configuration PROM," *The Programmable Gate Array Data Book*, Xilinx, 1991, pp. 2–175 thru 2–183.

"Technology Update—Interfacing alternatives," *EDN*, vol. 36, No. 20, Oct. 1, 1991, p. 60.

*Primary Examiner*—David L. Robertson
*Assistant Examiner*—Sharon Fenick
*Attorney, Agent, or Firm*—Schneck & McHugh

[57] ABSTRACT

A non-volatile memory connected to state logic is provided for autoloading peripheral target devices at power-on or system reset. The memory is preloaded with commands and data. At power-on or system reset the commands are executed in sequence, transferring data to selected target devices. Data is output in bit-serial fashion on a single line. Target devices are individually selected through use of separate clock lines. Clock signals on the clock lines can be internally generated using the state logic or a target-device-supplied clock can be received under program selection. The system reset signal is intercepted and retransmitted to control target device mode. System reset polarity, enable signal polarity, data block length, clock direction, internal clock frequency, and power-saving shutdown upon completion of all transfers are all programmably selectable features.

23 Claims, 6 Drawing Sheets

U.S. PATENT DOCUMENTS

| | | | |
|---|---|---|---|
| 5,220,673 | 6/1993 | Dalrymple et al. | 395/775 |
| 5,230,058 | 7/1993 | Kumar et al. | 395/800 |
| 5,252,965 | 10/1993 | Gidwani et al. | 340/825.56 |
| 5,263,168 | 9/1993 | Toms et al. | 395/700 |
| 5,274,771 | 12/1993 | Hamilton et al. | 395/275 |
| 5,327,497 | 7/1994 | Mooney et al. | 380/25 |

MEMORY SYSTEM FOR LOADING PERIPHERALS ON POWER UP

CROSS REFERENCE TO RELATED APPLICATION

The present application is a continuation-in-part of Ser. No. 07/923,315, filed Jul. 30, 1992, now abandoned.

TECHNICAL FIELD

The invention relates to integrated memory circuits, particularly adapted for conditioning a system at power-on or system reset.

BACKGROUND ART

A current trend in digital equipment is toward the use of increasingly complex integrated circuits whose final behavior is determined by programmable parameters transferred at power-on or system reset. In a state-of-the-art notebook computer for example, the programming parameters of a number of "peripheral" devices are loaded under control of a microprocessor which transfers the information from a non-volatile memory to volatile storage located inside each such device. Typically, the microprocessor transmits the data serially, either supplying a clock signal or accepting a clock signal from the target device. Sometimes separate, simple microprocessors are provided for this purpose.

It has been suggested that a specialized memory, much less complex than a microprocessor could be used instead for this purpose (c.f., XC1736A/XC1765 Serial Configuration PROM, The Programmable Gate Array Data Book, Xilinx Inc., 1991). The specialized memory is preloaded with the parameters for a "target" peripheral device. These parameters are retained in non-volatile storage. At power-on or system reset the specialized memory serially transfers the contents of its non-volatile storage to the programmable peripheral device. The peripheral device is the source of a transfer clock.

The prior art teaches many of the elements needed to create such a specialized memory. U.S. Pat. No. 4,245,302 to Amdahl, for example, teaches a typical instruction fetch-execute organization for a programmable device wherein coded instruction fields are decodable to organize hardware resources for accomplishing a complex task. Mackey et al., U.S. Pat. No. 4,791,384, teach data transfer from a nonvolatile PROM to a volatile RAM, and programmed selection of a clock signal from either internal or external sources. Guillot, U.S. Pat. No. 4,882,711, teaches a transfer of data from a non-volatile memory to volatile RAM at power-on, and writing into nonvolatile EEPROM, all accomplished within a single integrated circuit. Fung et al., U.S. Pat. No. 4,899,272, teach the transfer of data from non-volatile memory to volatile configuration registers under program control. The non-volatile memory is implemented using CMOS and battery backup. U.S. Pat. No. 5,021,963, to Brown et al., teaches a transfer of data from a nonvolatile memory to a volatile memory at power-on.

Recently a new class of programmably reconfigurable devices has appeared which are capable of significant changes in behavior based upon which of several setup parameters are loaded. The choice is often dictated by motherboard straps or microswitch settings. Existing specialized memories for loading such devices are limited to programming a single target device, and then only one choice of program.

It is an object of the present invention to provide a class of simple, flexible autoload memory systems which can meet the needs of this new class of programmable devices.

SUMMARY OF THE INVENTION

The above object has been met by the present invention which combines a non-volatile memory, a finite state controller, and a clock generator whereby clock pulses appropriate to a target device are generated under control of the finite state controller.

The finite state controller uses a portion of the non-volatile memory for storage of information to implement its own operation. This stored information is organized into "command blocks". One block of data for output to a target device is associated with each command block. The information in a command block is used by the sequential logic to perform a number of tasks including (1) locating output data in the memory, (2) determining how many bits of data are to be output, (3) selecting a particular target device, (4) determining whether an internal clock signal or a clock signal supplied from an external source, such as the target device will be used, (5) if an internal clock is selected, selecting its frequency, (6) determining whether an enable signal will be provided to the target device and if so what its polarity will be, (7) determining what polarity the system reset signal will be, and (8) determining whether additional target devices are to be loaded.

The command blocks and associated data blocks are preloaded into the non-volatile memory so that they are ready to function when the power-on condition is signalled by another part of the system. The information in memory is organized as pairs of command and data blocks. The pairs are stored in consecutive locations of memory to simplify the task of locating them.

A command block typically includes 8 bytes of information, but this may vary depending upon an application. The sequencing logic fetches a command block from memory, stores its bytes into registers, and uses the contents of these registers to control the outputting of the associated data block.

In a second embodiment, data is output in parallel format on a byte-wide bus. In this embodiment the output register receives data from the memory in parallel format and outputs the data in parallel format.

In a third embodiment, the memory is made available to the system as an addressable, serial storage device once the power-on transfers have been completed. The preloaded command and data blocks remain undisturbed in this embodiment. Previously unused memory space is organized by the sequencing logic as a serial store. A user provides a memory address in serial format and a read/write command, and serial data is output for a read or received and stored for a write relative to the user supplied address. A serial input, parallel output register is used to receive addresses and write data. Addresses are transferred to the finite state controller while write data is stored into memory.

In a fourth embodiment, a sequence of command fetching is defined in which some bytes fetched from a command block are used to control the manner in which other bytes of the command block are interpreted. An increase in flexibility results and is used to provide a simple decision making capability. The specialized memory of this fourth embodiment can receive a plurality of coded input lines. The coded inputs are logically ANDed with another field of the command block and the logical product is placed into a low-order end of a data transfer length counter, the upper bits being cleared.

This contents of the length counter is treated as a binary number which is decremented until it reaches zero (represented by zeros in all of the bits of the counter. The contents of a memory address iregister, used for fetching commands and data from the memory, are incremented each time the length counter is decremented. This operation, in effect gives the specialized memory an ability to "skip" to a different command block based upon the received code.

Thus, the newest class of programmably reconfigurable devices mentioned above can selectively be loaded with an appropriate set of parameters by the setting of strapping codes on a motherboard. The specialized memory of this fourth embodiment has two or more optional sets of programming parameters preloaded. The straps control which set of parameters is loaded at power up or system reset.

In a fifth embodiment of the present invention, the sequential state logic is responsive to a plurality of control inputs which can be connected to programmable devices being loaded. These control inputs are able to cause the specialized memory to disable its outputs, or pause an ongoing operation, or to reset itself under the control of another device. These inputs are independent of the system reset input, and allow the specialized memory to act as a slave to another device which acts as a master.

Best Mode for Carrying Out the Invention

Figure 1:
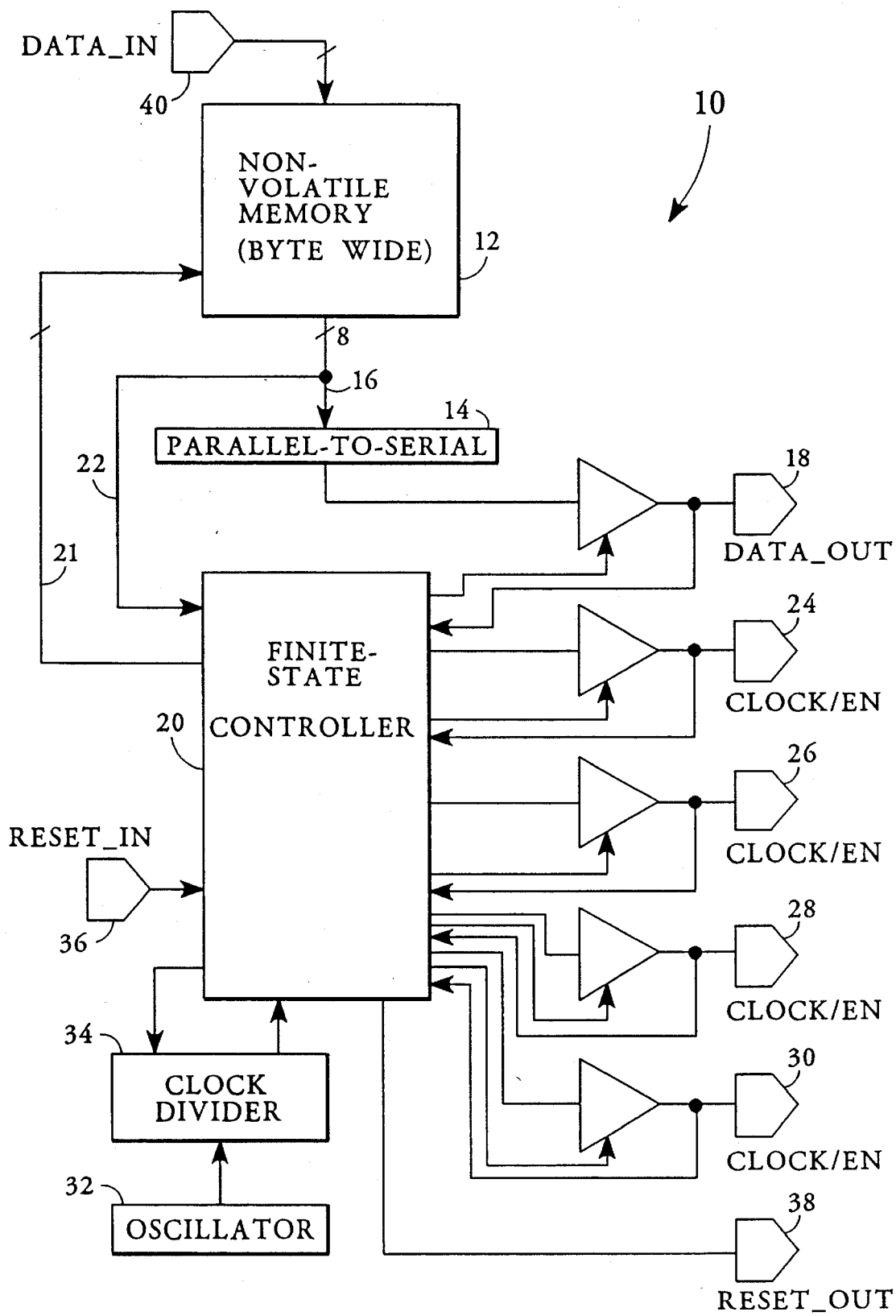
FIG. 1 is a block diagram of the specialized memory in accordance with the present invention.

With reference to FIG. 1, there is shown specialized memory 10 for loading operating parameters into programmable integrated circuits on system power-on or reset.

Specialized memory 10 includes non-volatile memory 12, such as an EEPROM memory block, for storage of command and data blocks, parallel load/serial output register 14 for receiving data in parallel format from memory 12 via bus 16 and serially outputting the data on output line DATA_OUT 18, finite state controller 20 for receiving command blocks from memory 12 via bus 22 and for interpreting each command block to provide a data transfer clock signal at a selected output line CLOCK/EN 24-30, or for receiving an externally generated transfer clock signal at a selected input line CLOCK/EN 24-30, clock oscillator 32 for generation of a basic clock signal, and clock divider 34 for reducing the frequency of the basic clock signal. Specialized memory 10 also includes input line RESET_IN 36 for intercepting a system reset signal, output line RESET_OUT 38 for retransmitting the system reset signal to target devices, and input line DATA_IN 40 for receiving data to be preloaded into nonvolatile memory 12.

Non-volatile memory 12 is preloaded with command/data block pairs, the data intended for transfer to selected target devices upon receipt of a system reset signal used to indicate detection of a system power-on condition, and the associated command used by the finite state controller 20 to accomplish the data transfer.

During the data transfer, parallel load/serial output register 14 receives data from non-volatile memory 12 in parallel format via byte-wide bus 16. The register contents are serially shifted, one bit at a time, to output line DATA_OUT 18. In a typical system a number of target devices are connected to receive the output of line 18.

A data transfer cycle includes the fetch of a command block from non-volatile memory 12 followed by the execution of the command block. The execution of the command block entails the output of the associated data. Finite state controller 20, typically a Programmable Logic Array (PLA), is responsible for fetching and executing command blocks. In the embodiment shown in FIG. 1 non-volatile memory 12 stores command blocks as a group of related 8-bit bytes. Controller 20 causes memory 12 to place the bytes comprising a command block one at a time on bus 22 by providing a memory address to the memory 12 on one or more address lines 21 to access the selected bytes. Controller 20 receives each of these bytes, and when all the bytes comprising a command block have been received, controller 20 has completed the "fetch" portion of a data transfer cycle.

As mentioned above, the "execution" portion of the cycle entails the transfer of data from non-volatile memory 12 to output line DATA_OUT 18. Execution of the command block involves the following primary activities: (1) reading the data block from non-volatile memory 12 one byte at a time; (2) loading each data byte read from memory 12, one at a time into output register 14 in parallel format; (3) shifting the contents of register 14 to serially output the data one bit at a time on output line DATA_OUT 18; (4) counting the number of data bits transmitted and comparing the count with a total number of bits to be transmitted; and (5) terminating the transfer when the proper number of bits has been sent.

In many systems, output data line DATA_OUT 18 is connected in common to an input line of each target device to which data is to be transferred. Because in such an implementation all target devices simultaneously receive the data intended for a single device, some means must be provided to insure that only the intended target devices loads its internal parameter storage with the data on the shared line. In the present invention this selection is accomplished by sending a clock signal to the intended target device only (or when a clock signal is supplied by the target device, by receiving a clock signal from the intended device only), hence multiple CLOCK/EN lines 24, 26, 28 and 30. When the clock is internally generated, and also during command block fetch, clock oscillator 32 supplies a basic clock signal. The frequency of this basic signal may be reduced by clock divider 34 so that the frequency of the transmitted clock signal, CLOCK/EN 24-30, can more accurately match the capabilities of a target device some of which operate at a much slower clock rate than specialized memory 10.

In a typical system, a reset signal is generated upon detection of the power-on condition or in the event of a system reset. In such systems this reset signal is often used to initiate the transfer of programming parameters to various programmable integrated circuits of the type with which the present invention is intended to be used. When used in such systems the inventor intends that the reset signal line will be broken and that specialized memory 10 will be inserted in the broken path, intercepting the system's reset signal at input line RESET_IN 36, and retransmitting a substitute reset signal at output line RESET_OUT 38. When this proposed configuration is adopted, the system reset signal's being asserted on input line RESET_IN 36 is remembered by the finite state controller 20. At the transition of the system reset signal from the asserted to the non-asserted level, the basic data transfer cycle described above is commenced. The target devices interpret an active reset signal as requiring that they receive programming parameters. To ensure that all data transfers are completed, specialized memory 10 will continue to assert its reset output signal on line RESET_OUT 38 throughout the combined intervals of system reset active (input line RESET_IN 36) and data transfers in progress. RESET_OUT 38 can be used to inhibit the system from operating until all programmed parameters have been transferred to their respective target devices.

Figure 2:
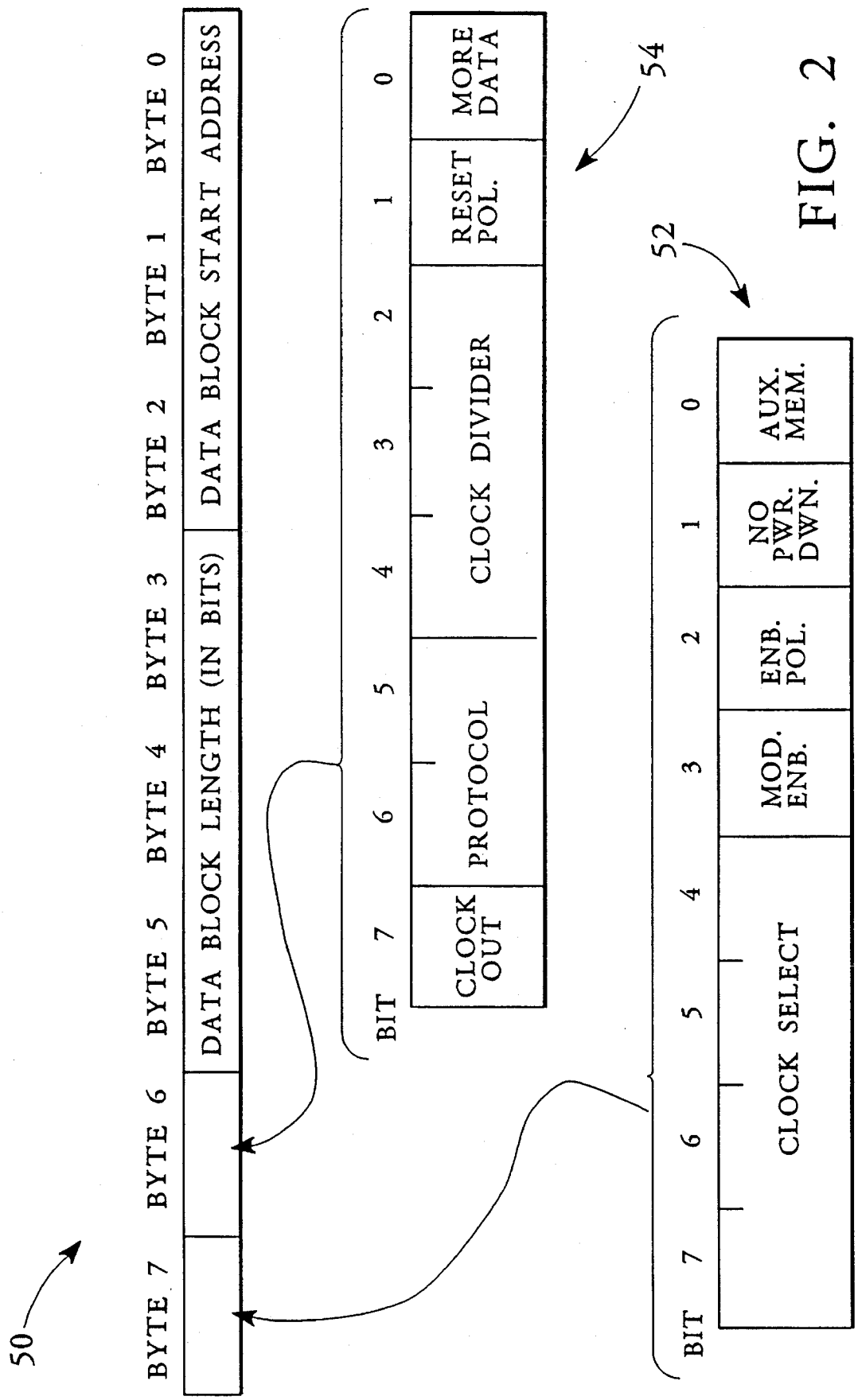
FIG. 2 is a pictorial diagram showing an example of field and bit coding in a command block for the specialized memory of FIG. 1.

An example of a typical command block 50 is shown in FIG. 2. The command block 50 includes 8 bytes, numbered left-to-right, 7 through 0, respectively. Bytes 2-0 represent a 24-bit address which is a location in non-volatile memory 12 at which the first byte of the associated data block will be found. Bytes 5-3 represent the number of data bits which are to be transferred, i.e., the length in bits of the associated data block. Bytes 7 (52) and 6 (54) include coded fields and bits used to customize the data transfer or the behavior of specialized memory 10 itself. The bits in each of these bytes are numbered from left to right, bits 7 through 0, respectively.

The four-bit field 7-4 of byte 7 (52) of this example is decoded by the finite state controller 20 to select one of the four CLOCK/EN input/output lines 24-30 of FIG. 1 for transmitting or receiving a data transfer clock signal. Bit 7 of command byte 6 is decodable to select the internally generated clock signal for output on the CLOCK/EN line specified by bits 7-4 of command byte 7. Bit 4-2 of byte 6 comprise a 3-bit field containing a number used by the clock divider 34 to reduce the basic frequency of an internally generated clock signal. By specifying the contents of these three elements of the command block 50, the direction, I/O line, and, if internally generated and within the limitations of the disclosed apparatus, the frequency of the data transfer clock can be fully determined.

Bits 6-5 of command byte 6 (54) provide a 2-bit field which allows for selection of one of four built-in serial transfer protocols, such as I$^2$C, MicroWire, Xilinx, or 2-Wire. MicroWire and Xilinx are trademarks. Details of these protocols can be found in the following publications: I$^2$C 80C51-Based 8-bit Micro-controller, Section 2, I$^2$C Circuit Bus, Signetics Co., 1992; Xilinx, The Programmable Gate Array Data Book, supra; 2-Wire, 80C51-Based 8-bit Micro-controller, pages 31–37, supra; and MicroWire, Electronic Design News (EDN), page 60, Oct. 1, 1991. In the example, finite state controller 20 is capable of emulating each of these protocols. The protocol specified will be one that is compatible with the needs of the target device with which the command block is intended to cooperate to effect the parameters transfer.

Bits 3-2 of command byte 7 (52) of the example are used to cause specialized memory 10 to provide an enable signal to target devices which expect one. When bit 3 is asserted the finite state controller 20 will generate an enable signal whose polarity will be determined by the level of bit 2. In one embodiment the enable signal is transmitted on the CLOCK/EN line next in order below the selected clock line. For example, if bits 7-4 of command byte 7 are selecting line CLOCK/EN 24, the enable signal will be output on CLOCK/EN 26. In a second example, if clock line CLOCK/EN 30 is selected, the enable signal will be output on CLOCK/EN 24. In this manner, the same I/O pins and system interconnections can be used for a dual purpose. In an alternative embodiment (not shown in FIG. 2) a command block can include an additional (ninth) byte having an enable select field similar to the four-bit clock select field (bits 7-4) of command byte 7, previously discussed above. Use of this enable select field allows any CLOCK/EN line, 24, 26, 28 or 30, not being used for transmitting or receiving the data transfer clock signal, as previously described, to be selected by the finite state controller 20 to serve as an enable line transmitting an enable signal. Such an arrangement provides increased flexibility in the connection of various target devices to the several CLOCK/EN lines 24, 26, 28 and 30 of the specialized memory 10.

Use of bit 1 of command byte 6 (54) as shown in the example of FIG. 2 allows the specialized memory 10 to accept and generate a reset signal having one of two polarities. Some systems use a reset signal which is "low active" while others use a reset signal which is "high active". Likewise the target devices found in each of these systems expect a reset signal of the correct polarity.

Bit 1 of command byte 7 informs the finite state controller 20 that a power-down power saving sequence is or is not to follow completion of the final data transfer cycle. Many modern integrated circuits for use in battery operated devices shut themselves down into a power conserving standby mode when not in use. Bit 1 of command byte 7 permits such operation of the specialized memory 10 to be enabled or overridden.

Bit 0 of command byte 6 is used to inform the finite state controller 20 that upon completion of a current data transfer cycle, controller 20 is to fetch another command block to begin another data transfer cycle. The command block will be located in memory 12 such that its first byte is at a known location relative to the location of the last data byte of the current data transfer, typically the next byte.

Discussion of bit 0 of command byte 7 is reserved to a later point in this description.

Figure 3:
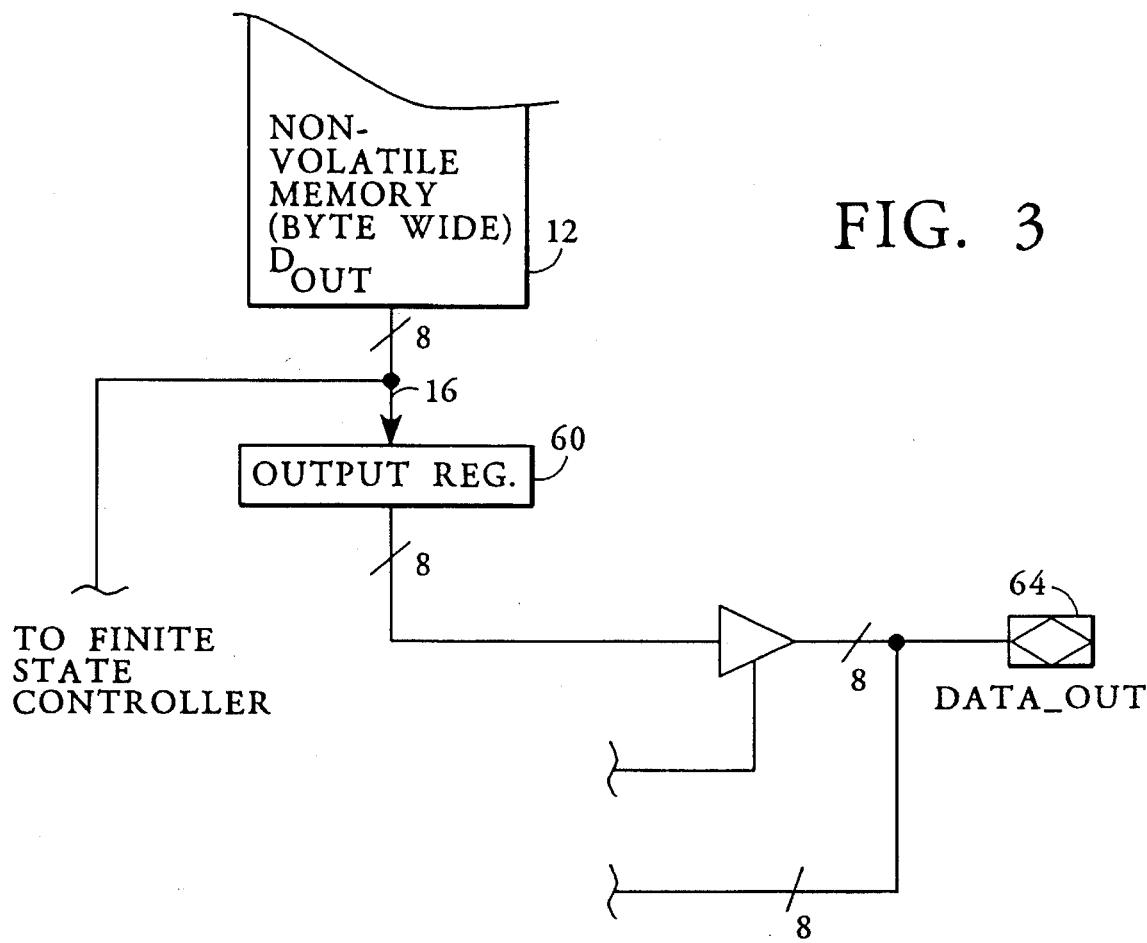
FIG. 3 is a partial block diagram of a second embodiment of the specialized memory of FIG. 1 showing a byte-wide data output.

FIG. 3 depicts a second embodiment which transfers output data via a byte-wide bus on data output lines DATA_OUT$_i$ 64. As shown, data is read from nonvolatile memory 12 in byte-wide groups and loaded into output register 60 which stores one byte. The contents of output register 60 are gated onto output lines DATA_OUT$_i$ 64 8 bits at a time. In this alternative embodiment the data block length field of the associated command block represents the length of the data block in bytes rather than in bits.

Figure 4:
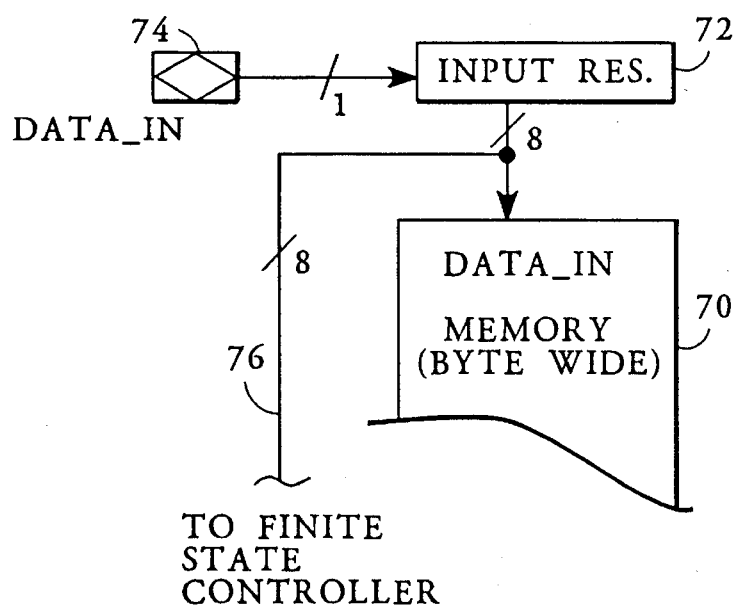
FIG. 4 is a partial block diagram of a third embodiment of the specialized memory of FIG. 1 showing a serial data input register.

FIG. 4 depicts a third embodiment in which the specialized memory 10 is made available to the system for use as a randomly addressable serial memory following completion of the power-on data transfers. Bit 0 of command byte 7 of FIG. 2 is used to select whether or not the memory shall operate in this mode. When the auxiliary memory mode is selected, upon completion of execution of a command block having bit 0 of command byte 6 indicating "no more data", the finite state controller 20 organizes the specialized memory 10 to operate as a randomly addressable serial read/write memory.

In this embodiment, non-volatile memory 12 is replaced with a memory 70 which can be read from or written into and which is capable of retaining its data in the event of a power failure. There are a number of standard memory configurations suitable for this purpose.

Read/Write commands, memory addresses, data block length, and write data are received serially on input line DATA_IN 74 and are serially shifted into input register 72. Under control of the finite state controller 20, the commands and memory addresses are transferred, one byte at a time via bus 76 from input register 72 to finite state controller 20. Finite state controller 20 uses the command to determine whether to read or to write. It uses the memory address to locate the first data byte in the memory 70, and it uses the data block length to terminate the memory operation after the correct amount of data has been read or written. During a write operation, the data bytes are written 8 bits at a time from the input register to memory 70. During a read operation, data is transferred from the memory via bus 16 (FIG. 1) to serial output register 14 and serially transmitted to the requester via data output line DATA_OUT 18. Alternatively the byte-wide output depicted in FIG. 3 can be used to return data read from the memory one byte at a time.

The use of the specialized memory 10 as an auxiliary random access serial memory is possible when the power-on initialization parameters use less than the full storage capacity of the device. If there is a concern that the parameter command and data blocks may inadvertently be overwritten while the specialized memory 10 is operated in the auxiliary mode, the finite state controller 20 can be adapted to reject user provided addresses which are less than a guard value. The guard value corresponds to the numerical address of a location beyond the last used parameter location.

Figure 5:
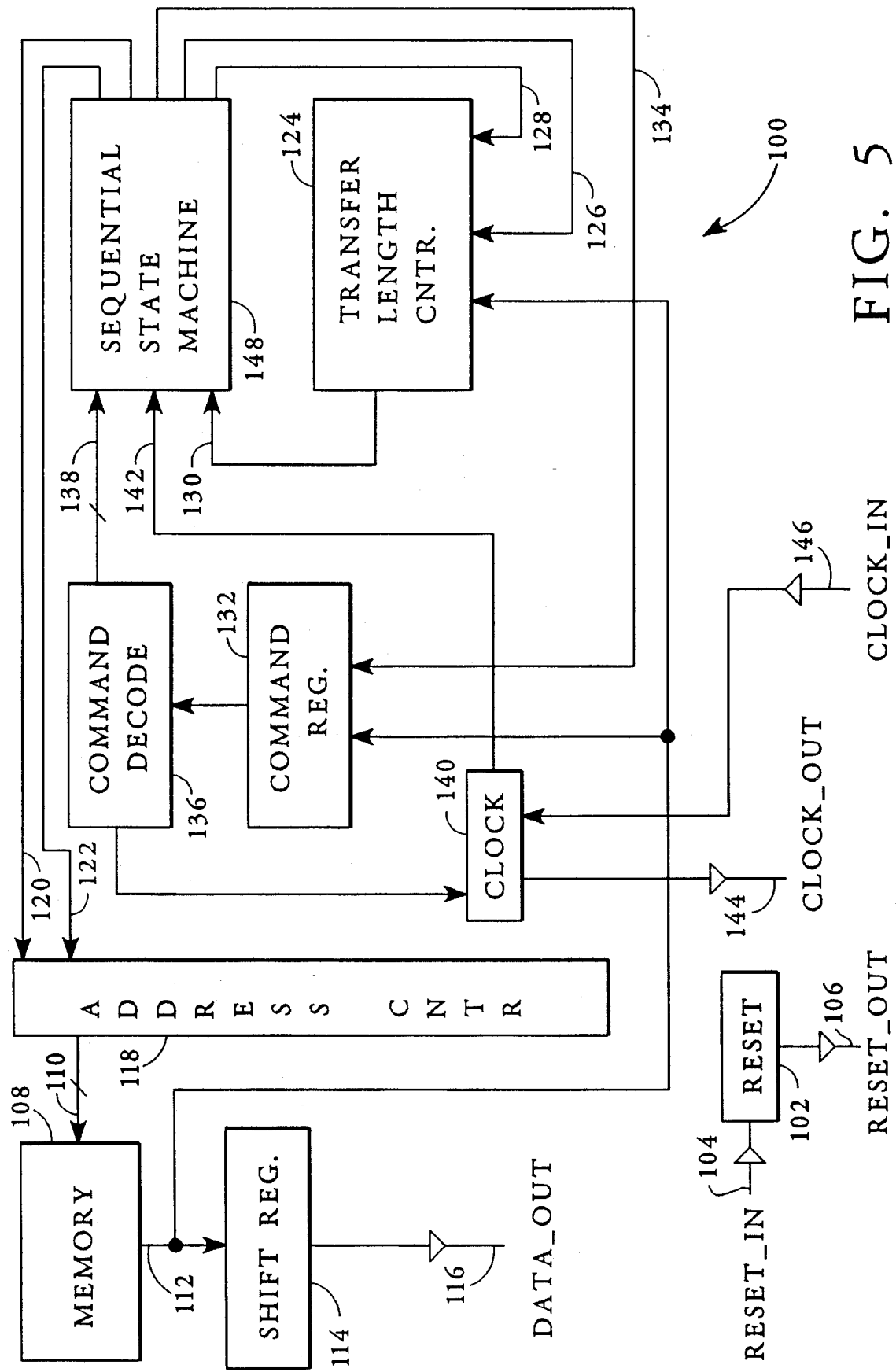
FIG. 5 is a block diagram of a fourth embodiment of the specialized memory of the present invention.

FIG. 5 is a block diagram of a fourth embodiment of the specialized memory 100 of the present invention. Reset circuit 102 receives a power on or system reset signal on line RESET_IN 104. When the reset signal is asserted, circuit 102 asserts an output signal on line RESET_OUT 106. When the reset signal on line 104 returns to a non-asserted state, specialized memory 100 begins to operate and signals a BUSY status by continuing to assert the output signal on line RESET_OUT 106. When specialized memory 100 has completed its operation, the signal on line RESET_OUT 106 is returned to a non-asserted level.

Specialized memory 100 is a single integrated circuit. It includes a memory 108 which, in a preferred embodiment, is a non-volatile memory and is preloaded with command and data blocks, as described previously with respect to the device shown in FIG. 1. Memory 108 is organized into addressable locations, each one byte wide. Memory address signals are applied on lines 110. The contents of an addressed location is available as memory data on lines 112. A shift register 114 receives the memory data for serial output via line DATA_OUT 116.

Memory address counter 118 supplies a memory address via lines 110. Address counter 118 is initialized to a predetermined address when an initialize_address control signal on line 120 is asserted. In a preferred embodiment, address counter 118 is initialized to an address being all zeros. The memory address is incremented from a present address to a next address when an increment_address control signal on line 122 is asserted.

Data transfer length counter 124 is 24 bits long and is divided into 3 one-byte sections for being loaded from memory data lines 112. Each section of length counter 124 is loaded with a byte of memory data when a corresponding load_length_byte control signal is asserted on one of lines 126. The 24-bit contents of length counter 124 is decremented from a present count to a next count when a decrement_count control signal is asserted on line 128. When the length count equals zero, a signal equals_zero is asserted on length counter output line 130.

A command register 132 is loadable one byte at a time from memory data lines 112 when corresponding load_command control signals are asserted on lines 134. Command register outputs are decoded by command decoding logic 136. The decoded output signals are provided on lines 138.

Internal clock generator 140 provides a clock signal on line 142. Generator 140 also includes a divider circuit which is used to lengthen a duty cycle and pulse width of a data transfer clock output on line CLOCK_OUT 144. Provision is made for selection of an externally generated data transfer clock received on line CLOCK_IN 146.

Sequential state machine 148 receives the decoded command signals, the equal_zero signal and the clock, and from these it generates all necessary control signals used by the other elements to fetch and execute commands stored in memory 108.

The command structure of specialized memory 100 differs from that discussed with respect to FIG. 1. Rather than a single command which is fetched as a sequence of bytes and then interpreted and executed as a single unit, the commands of the fourth embodiment are interpreted and executed as they are fetched, one byte at a time. For example, a coded field of each command determines what action is to be taken to "execute" the command. Many of the commands require that some of the bits or a coded field of the command byte be used in a specified way. Other commands require that the next byte obtained from memory be used in a specified way, or that the next three bytes be so used. A command might require for example that the succeeding three bytes be loaded into the data transfer length counter 124. A command which initiates a data transfer, on the other hand, results in a block of successive data bytes being read from memory 108 and transmitted.

The fourth embodiment shown in FIG. 5 differs in another important respect from the embodiments based upon the device shown in FIG. 1. As has been explained above, the address counter 118 is responsive to the initialize_address control signal on line 120 and to the increment_address control signal on line 122. No provision is made for loading bytes from memory data lines 112 into the memory address counter 118. Thus every "fetch" cycle and every "execute" cycle ends with assertion of the increment_address control line 122 so that the following memory location is accessed next.

A typical command fetch/execute cycle begins at the completion of a previous command execution. Sequential state machine ("state machine") 148 asserts the increment_ address control signal on line 122 and the memory address is incremented to address the next memory location. At that location, for this example of a fetch/execute cycle, is located the first byte of a new command block. That byte is read from the memory 108 and loaded into command register 132 when state machine 148 asserts an appropriate load_command_byte control signal on one of lines 134. A field of this command byte is decoded and used by the state machine 148 to determine what subsequent action to take. The memory address is repeatedly incremented as successive bytes of the command block are read out and loaded into additional portions of the command register 132 and into the data transfer length counter 124.

The "fetch" portion of the cycle is now complete, and the "execution" phase can begin. During the execution of a data transfer to a peripheral device, successive bytes of a data block are read from consecutive locations in memory 108 by repeated incrementing of the memory address register 118. Each byte of the data block is loaded into shift register 114. The state machine times the assertion of the memory address increment signal and a shift register load signal such that as the final data bit of each byte of output data is shifted out of the shift register and onto output line DATA_OUT 116, the next byte of the data block is ready on memory data lines 112 to be loaded into the shift register 114. As a result of this timing relationship, the data block appears as a continuous serial stream of data bits on the DATA_OUT line.

The shift register is shifted at the same rate as the lengthened duty cycle clock signal being output on the CLOCK_OUT line 144, or a clock signal being received on line CLOCK_IN 146 if an external transfer clock is selected. The data transfer length counter 124 is being decremented at this same clock rate. The length counter 124 is counting the number of bits being output. The length counter 124 was originally loaded with a number corresponding to the number of bits to be output, and will generate the equal_zero signal as the final bit of the data block is being output. The assertion of the equal_zero signal on line 130 will cause the state machine 148 to terminate the execution phase and to begin a new fetch cycle.

As with the preceding embodiments, coded fields, and bits like those exemplified in FIG. 2 above, of a command byte loaded into the command register 132 are used to control the direction of the data transfer clock, its polarity, and select a data transfer protocol.

Figure 6:
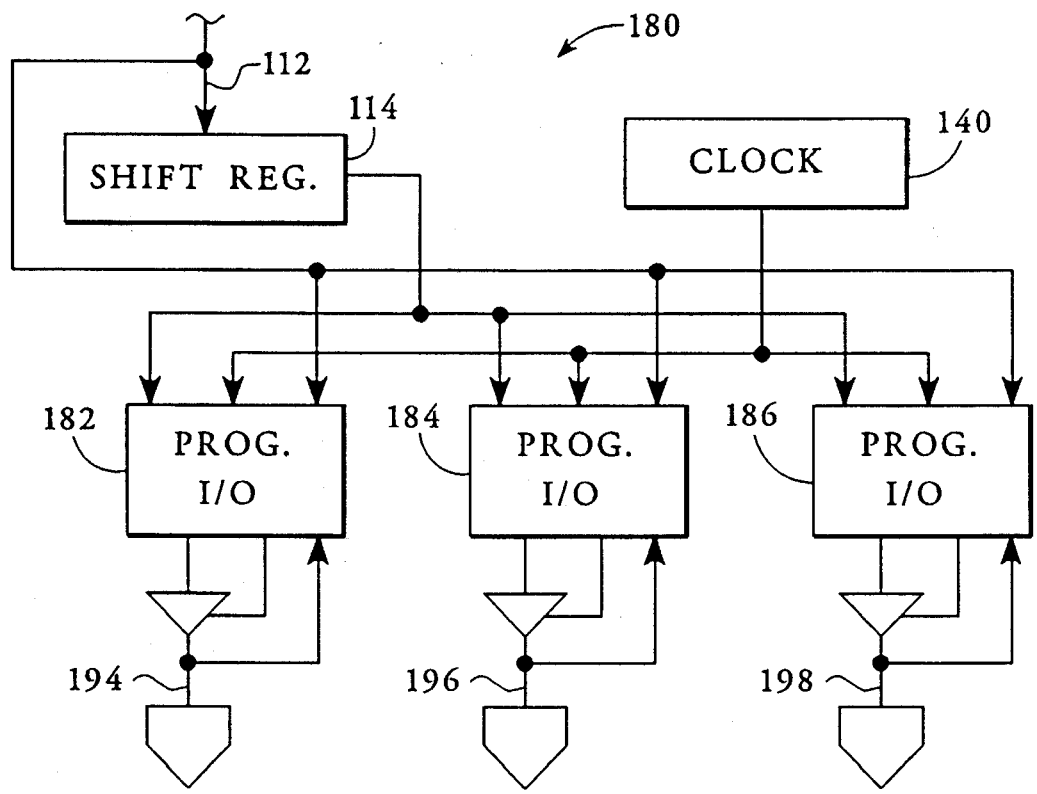
FIG. 6 is a partial block diagram showing an embodiment of the specialized memory of FIG. 5 having programmable input/output pads.

FIG. 6 is a partial block diagram showing an expanded embodiment of the specialized memory 100 of FIG. 5 showing additional apparatus allowing programmable selection of a plurality of I/O pads as input or output functions. Three typical circuits 182, 184, 186 are shown for this purpose, but the actual number of programmable pads can differ. Logic circuitry 182, 184 and 186 for implementing programmable input/output control for the I/O pads 194, 196 and 198 are well known in the art.

One of the command bytes which has been loaded into the command register 132, specifies that the information in subsequent bytes is to be used to program a function for one of the programmable pads 194, 196, 198. These subsequent command bytes include a subfield which is decodable by the command decode 136 of FIG. 5 to select a programmable I/O pad 194, 196 or 198 and to indicate whether that selected pad is to serve as an input line or as an output line for signals. Portions of subsequent bytes from memory 108 are transferred via lines 112 under control of state machine 148. The information so transferred is stored in latches within the circuits 182, 184, 186 and determines a function of the associated pad. Thus, an I/O pad 194, 196 or 198 can be programmed, for example, to input a clock signal CLOCK_IN, to output an enable or reset signal with constant logic level HIGH or LOW, or to output serial data DATA_OUT, and not simply just to output a clock signal CLOCK_OUT.

Figure 7:
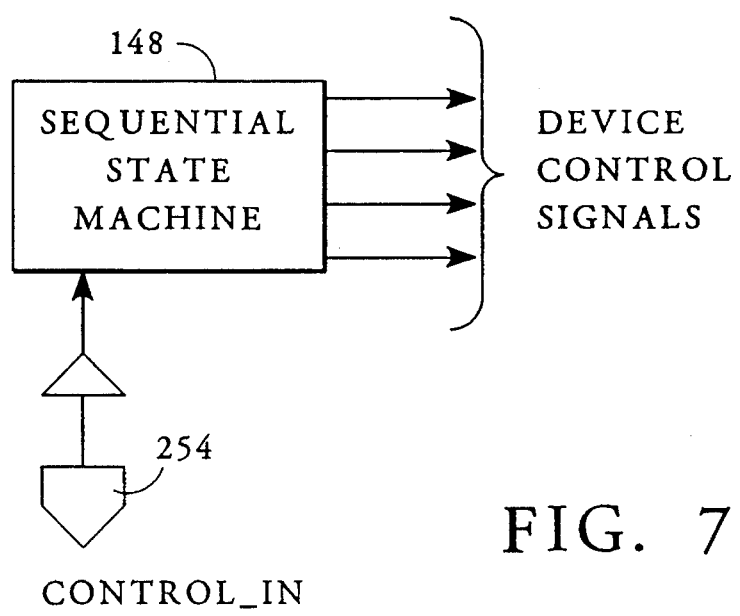
FIG. 7 is a partial block diagram showing an embodiment of the specialized memory of FIG. 5 having external control signal input.

FIG. 7 is a partial block diagram showing an expanded embodiment of specialized memory 100 of FIG. 5 including apparatus for modifying the behavior of state machine 148 so that, under program control, an external input signal on line CONTROL_IN 254 can cause the specialized memory to do one of the following when the external input signal is asserted: (1) cause all output signals to be disabled; (2) cause the specialized memory to reset itself and go into a power saving mode; or (3) cause the specialized memory to pause, disable outputs, wait for the external input signal to return to a non-asserted level, and then resume from a point where it left off.

Figure 8:
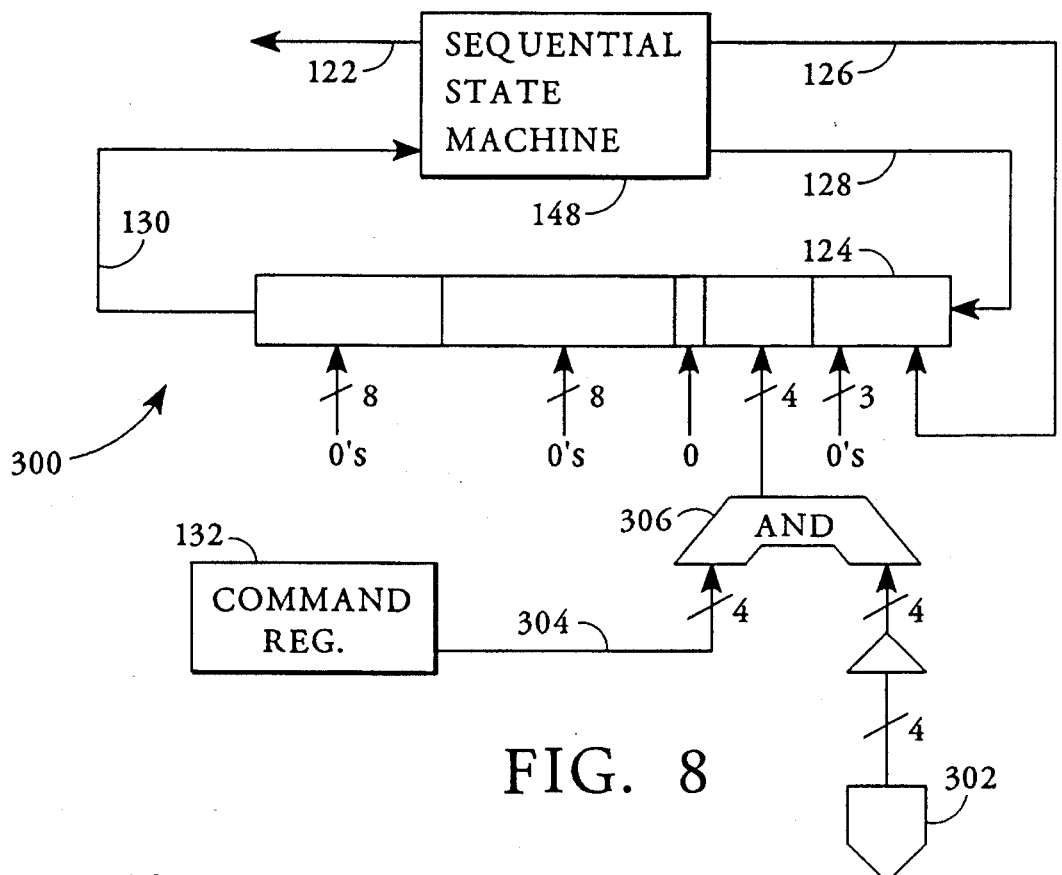
FIG. 8 is a partial block diagram showing an embodiment of the specialized memory of FIG. 5 having decision-making ability.

FIG. 8 is a partial block diagram showing an expanded embodiment of specialized memory 100 of FIG. 5 showing apparatus 300 which allows the device to receive 4 external input signals and to increment the contents of the memory address counter 118 a number of times equal to 8 times the binary number represented by the levels of the four input signals treated as a coded field. For example, if the levels on the four lines STRAP_IW3-0 302 are "0101" the contents of memory address register 118 will be incremented 40 times. If the levels are "1011" the contents of the memory address register 118 will be incremented 88 times. The result is an externally determined "SKIP" in which the number of memory locations "skipped" is a function of the external inputs. This feature allows motherboard straps or micro switch settings to select the program parameters transferred.

Figure 9:
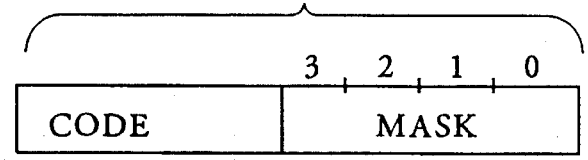
FIG. 9 is a pictorial diagram showing an example of a command field being used as a strap mask.

When a command byte in a predetermined position of the command register 132 is decoded to result in this SKIP command, a coded field of 4 bits of the command byte (FIG. 9) is transferred as a 4-bit mask via lines 304 to an AND circuit 306 and logically ANDed with the four input levels on lines 302. The 4 bits which result from this AND operation become bits 6-3 of the contents of the data transfer length counter 124. Zeros are loaded into the remaining portions of the transfer length counter 124. These contents of the data transfer length counter 124 are decremented under control of the state machine 148 until the equal_zero signal on line 130 is asserted. The memory address counter 118 is incremented each time the transfer length counter is decremented. When the assertion of the equal_zero signal indicates the end of the execution of this command, the next command byte is fetched from the incremented memory address, thus producing a SKIP command in which the number of memory locations skipped was determined by the mask bits and the external inputs.

Figure 10:
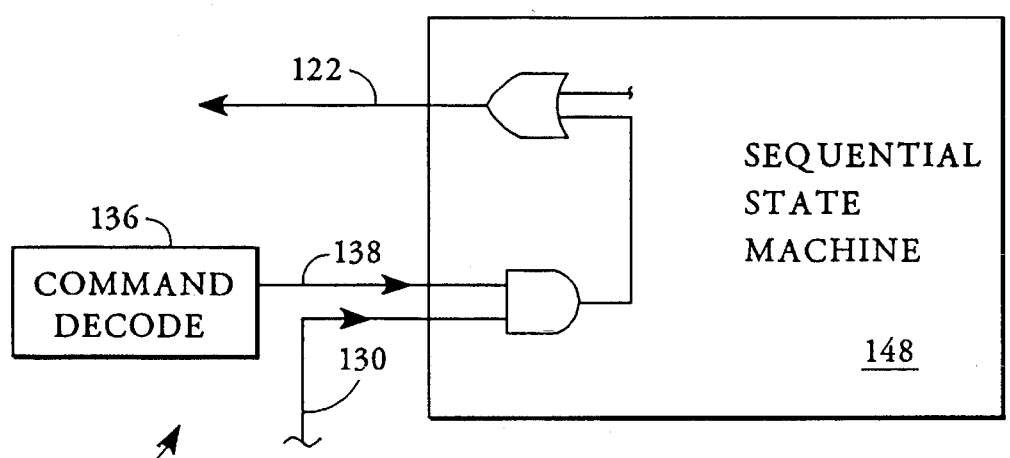
FIG. 10 is a partial block diagram showing an embodiment of the specialized memory of FIG. 5 having a WAIT command.

FIG. 10 is a partial block diagram showing an expanded embodiment of the specialized memory 100 of FIG. 5, including circuits 400 used to implement a WAIT command. The command decoding logic 136 decodes a WAIT command just as it decodes other commands, and provides a decoded output signal on line 138 to the state machine 148, as previously discussed with reference to FIG. 5. In the performance of a WAIT command, a count is loaded into the data transfer length counter 124 of FIG. 5 from the memory 108 via data line 112 in the same manner previously described, which is then decremented at the selected clock rate. However, the memory address counter 118 of FIG. 5 is not incremented until an equal zero signal assertion is received by the state machine 148 on line 130 from the data transfer length counter 124, indicating the end of the execution phase of the WAIT command. At that point, the contents of the memory address counter 118 is incremented one time, by means of a control signal on line 122 in the same manner as described previously, and the next command byte is fetched from this next address. The result is a program determined WAIT based upon the size of the number loaded into the data transfer length counter 124 and the repetition rate of the selected clock.

I claim:

1. An autoload memory system, in a computer system, for initializing a plurality of peripheral devices connected to said computer system, said autoload memory system comprising:

a memory having means for transferring its stored contents on power-up or reset of the computer system, said memory storing both commands and data simultaneously, wherein data consist of blocks of information to be transferred to said peripheral devices for initialization thereof, said memory having a byte wide input register, a byte wide output register, and an array of memory elements grouped in addressable storage bytes holding said commands and said data, and a finite state means connected to said memory for receiving all of said commands and said data directly therefrom, wherein commands consist of bytes of information to be interpreted by said finite state means, including information designating a specified peripheral device as a destination for each data block, to facilitate transfer of said data to said peripheral devices, an oscillator means connected to said finite state means to produce pulses of selected length to facilitate the timing of a transfer of each data block from said memory to said specified peripheral devices, said finite state means further comprising an output means connected to a plurality of said peripheral devices for communicating pulses thereto, said finite state means further including (a) a memory address counter means for providing a memory address to access selected commands and data from said addressable storage bytes, (b) a data transfer length counter means for counting a selected number of said bytes of data to be output from said addressable storage bytes, and (c) a means for receiving a plurality of strap signals on STRAP-IN lines, then carrying out a logical AND operation on a logic level associated with each of said strap signals and a different bit of a specified bit field of said accessed selected commands, then loading a resulting logical product into predetermined bit positions of said data transfer length counter means and loading zeros into remaining bit positions of said data transfer length counter means, then decrementing the loaded contents of said data transfer length counter means until said decremented contents are equal to a predetermined number, and incrementing an address in said memory address counter means each time said contents of said data transfer length counter means is being decremented.

2. An autoload memory system, in a computer system, for initializing a plurality of peripheral devices connected to said computer system, said autoload memory system comprising:

a memory having means for transferring its stored contents on power-up or reset of the computer system, said memory storing both commands and data simultaneously, wherein data consist of blocks of information to be transferred to said peripheral devices for initialization thereof, said memory having a byte wide input register, a byte wide output register, and an array of memory elements grouped in addressable storage bytes holding said commands and said data, and a finite state means connected to said memory for receiving all of said commands and said data directly therefrom, wherein commands consist of bytes of information to be interpreted by said finite state means, including information designating a specified peripheral device as a destination for each data block, to facilitate transfer of said data to said peripheral devices, an oscillator means connected to said finite state means to produce pulses of selected length to facilitate the timing of a transfer of each data block from said memory to said specified peripheral devices, said finite state means further comprising an output means connected to a plurality of said peripheral devices for communicating pulses thereto, wherein at least one of said commands is a WAIT command, said WAIT command initiating a sequence of operations, including loading command bytes representing a number from said memory into a data transfer length counter means, then decrementing the number in said data transfer length counter means until said number is equal to a predetermined second number, then incrementing the contents of a memory address counter and fetching a next command.

3. An autoload memory system, in a computer system, for initializing a plurality of peripheral devices connected to said computer system, said autoload memory system comprising:

a memory means for storage of both pre-loaded command blocks and pre-loaded data blocks simultaneously, wherein said data blocks consist of information to be transferred to said peripheral devices for initialization thereof, said memory means having means for transferring its stored contents on power-up or reset of the computer system, said memory means having an output;

an output register means having an input connected to said output of said memory means to receive said data blocks from said memory means and having a data output line, DATA_OUT, to provide said data blocks at least one bit at a time on said DATA_OUT line, said DATA_OUT line connecting in common with all of said peripheral devices allowing a data block intended for one specific peripheral device to also be received by all other peripheral devices simultaneously;

a plurality of CLOCK/EN lines connected to said plurality of peripheral devices;

a finite state means connected to said output of said memory means to receive directly from said memory means all of said command blocks, wherein said command blocks consist of bytes of information to be interpreted by said finite state means, including information designating a specified peripheral device as a destination for each data block, to facilitate transfer of said data blocks to said peripheral devices, said finite state means having means for interpreting said command blocks to perform specified functions including selecting a specific CLOCK/EN line for output of a clock signal used to transfer said data blocks on the DATA_OUT line;

a clock generator having oscillator means for generating a basic clock signal and frequency divider means for changing a frequency of said basic clock signal and for supplying a resulting clock signal to said finite state means;

said finite state means further including a means, connected to the plurality of CLOCK/EN lines, and responsive to said command block information designating a specified peripheral device, for transmitting to said specified peripheral device both said resulting clock signal and an enable signal on two of said CLOCK/EN lines connected to the same said specified peripheral device, whereby a data block intended for that specified peripheral device designated by said command block and transmitted on said DATA_OUT line to all of said peripheral devices is loaded only into said specified peripheral device receiving said clock signal and said enable signal said finite state means further including a RESET_IN input line for receiving a reset input signal which initializes said finite state means when at an active signal level and which initiates a plurality of output data transfers from said memory means upon a transition from an active to an inactive signal level, and a RESET_OUT output line connected to all of said peripheral devices, for transmitting a substitute reset signal with an active signal level while said reset input signal is active and continuing to have an active signal level while said output data transfers are in progress.

4. An autoload memory system as set forth in claim 3 wherein a transition to an inactive signal level of said reset input signal initiates a fetch and execution of a first command block by said finite state means.

5. An autoload memory system, in a computer system, for initializing a plurality Of peripheral devices connected to said computer systems said autoload memory system comprising:

a memory means for storage of both pre-loaded command blocks and pre-loaded data blocks simultaneously, wherein said data blocks consist of information to be transferred to said peripheral devices for initialization thereof, said memory means having means for transferring its stored contents on power-up or reset of the computer system, said memory means having an output;

an output register means having an input connected to said output of said memory means to receive said data blocks from said memory means and having a data output line, DATA_OUT, to provide said data blocks at least one bit at a time on said DATA_OUT line, said DATA_OUT line connecting in common with all of said peripheral devices allowing a data block intended for one specific peripheral device to also be received by all other peripheral devices simultaneously;

a plurality of CLOCK/EN lines connected to said plurality of peripheral devices;

a finite state means connected to said output of said memory means to receive directly from said memory means all of said command blocks, wherein said command blocks consist of bytes of information to be interpreted by said finite state means, including information designating a specified peripheral device as a destination for each data block, to facilitate transfer of said data blocks to said peripheral devices, wherein said command blocks include a bit field specifying one of the plurality of CLOCK/EN lines and a single bit designating an input/output status of said one of said CLOCK/EN lines specified by said bit field, said finite state means having means for interpreting said command blocks to perform specified functions including selecting said specified CLOCK/EN line for use by a clock signal to transfer said data blocks on the DATA_OUT line;

a clock generator having oscillator means for generating a basic clock signal and frequency divider means for changing a frequency of said basic clock signal and for supplying a resulting clock signal to said finite state means; and said finite state means further comprising a means, connected to the plurality of CLOCK/EN lines, and responsive to said command block information designating a specified peripheral device, for transmitting to said specified peripheral device both said resulting clock signal and an enable signal on two of said CLOCK/EN lines connected to the same said specified peripheral device, whereby a data block intended for that specified peripheral device designated by said command block and transmitted on said DATA_OUT line to all of said peripheral devices is loaded only into said specified peripheral device receiving said clock signal and said enable signal.

6. An autoload memory system, in a computer system, for initializing a plurality of peripheral devices connected to said computer system, said autoload memory system comprising:

a memory means for storage of both pre-loaded command blocks and pre-loaded data blocks simultaneously, wherein said data blocks consist of information to be transferred to said peripheral devices for initialization thereof, said memory means having means for transferring its stored contents on power-up or reset of the computer system, said memory means having an output;

an output register means having an input connected to said output of said memory means to receive said data blocks from said memory means and having a data output line, DATA_OUT, to provide said data blocks at least one bit at a time on said DATA_OUT line, said DATA_OUT line connecting in common with all of said peripheral devices allowing a data block intended for one specific peripheral device to also be received by all other peripheral devices simultaneously;

a plurality of CLOCK/EN lines connected to said plurality of peripheral devices;

a finite state means connected to said output of said memory means to receive directly from said memory means all of said command blocks, wherein said command blocks consist of bytes of information to be interpreted by said finite state means, including information designating a specified peripheral device as a destination for each data block, to facilitate transfer of said data blocks to said peripheral devices, said command blocks including a bit field used to specify a clock transition direction for a selected CLOCK/EN output signal, a first direction being defined by a signal transition from a first level to a second level and a second direction being defined by a signal transition from a second level to a first level, said finite state means having means for interpreting said command blocks to perform specified functions including selecting a specific CLOCK/EN line for output of a clock signal used to transfer said data blocks on the DATA_OUT line;

a clock generator having oscillator means for generating a basic clock signal and frequency divider means for changing a frequency of said basic clock signal and for supplying a resulting clock signal to said finite state means; and said finite state means further comprising a means connected to the plurality of CLOCK/EN lines, and responsive to said command block information designating a specified peripheral device, for transmitting to said specified peripheral device both said resulting clock signal and an enable signal on two of said CLOCK/EN lines connected to the same said specified peripheral device, whereby a data block intended for that specified peripheral device designated by said command block and transmitted on said DATA_OUT line to all of said peripheral devices is loaded only into said specified peripheral device receiving said clock signal and said enable signal.

7. An autoload memory system, in a computer system, for initializing a plurality of peripheral devices connected to said computer system, said autoload memory system comprising:

a memory means for storage of both pre-loaded command blocks and pre-loaded data blocks simultaneously, wherein said data blocks consist of information to be transferred to said peripheral devices for initialization thereof, said memory means having means for transferring its stored contents on power-up or reset of the computer system, said memory means having an output;

an output register means having an input connected to said output of said memory means to receive said data blocks from said memory means and having a data output line DATA_OUT to provide said data blocks at least one bit at a time on said DATA_OUT line, said DATA_OUT line connecting in common with all of said peripheral devices allowing a data block intended for one specific peripheral device to also be received by all other peripheral devices simultaneously;

plurality of CLOCK/EN lines connected to said plurality of peripheral devices;

a finite state means connected to said output of said memory means to receive directly from said memory means all of said command blocks, wherein said command blocks consist of bytes of information to be interpreted by said finite state means, including information designating a specified peripheral device as a destination for each data block, to facilitate transfer of said data blocks to said peripheral devices; said command blocks including a field designating one of a plurality of serial data transfer protocols preprogrammed into said finite state means to facilitate an output data transfer, said finite state means having means for interpreting said command blocks to perform specified functions including selecting a specific CLOCK/EN line for output of a clock signal used to transfer said data blocks on the DATA_OUT line;

a clock generator having oscillator means for generating a basic clock signal and frequency divider means for changing a frequency of said basic clock signal and for supplying a resulting clock signal to said finite state means; and said finite state means further comprising a means, connected to the plurality of CLOCK/EN lines, and responsive to said command block information designating a specified peripheral device, for transmitting to said specified peripheral device both said resulting clock signal and an enable signal on two of said CLOCK/EN lines connected to the same said specified peripheral device, whereby a data block intended for that specified peripheral device designated by said command block and transmitted on said DATA_OUT line to all of said peripheral devices is loaded only into said specified peripheral device receiving said clock signal, and said enable signal.

8. An autoload memory system, in a computer system, for initializing a plurality of peripheral devices connected to said computer system, said autoload memory system comprising:

a memory means for storage of both pre-loaded command blocks and pre-loaded data blocks simultaneously, wherein said data blocks consist of information to be transferred to said .peripheral devices for initialization thereof, said memory means having means for transferring its stored contents on power-up or reset of the computer system, said memory means having an output;

an output register means having an input connected to said output of said memory means to receive said data blocks from said memory means and having a data output line DATA_OUT to provide said data blocks at least one bit at a time on said DATA_OUT line, said DATA_OUT line connecting in common with all of said peripheral devices allowing a data block intended for one specific peripheral device to also be received by all other peripheral devices simultaneously;

a plurality of CLOCK/EN lines connected to said plurality of peripheral devices;

a finite state means connected to said output of said memory means to receive directly from said memory means all of said command blocks, wherein said command blocks consist of bytes of information to be interpreted by said finite state means, including information designating a specified peripheral device as a destination for each data block, to facilitate transfer of said data blocks to said peripheral devices, said finite state means having means for interpreting said command blocks to perform specified functions including selecting a specific CLOCK/EN line for output of a clock signal used to transfer said data blocks on the DATA_OUT line;

a clock generator having oscillator means for generating a basic clock signal and frequency divider means for changing a frequency of said basic clock signal and for supplying a resulting clock signal to said finite state means, wherein said command blocks include a field specifying an integer wherein said frequency divider means receives and divides a basic clock frequency of said basic clock signal by said integer to obtain said resulting clock signal; and said finite state means further comprising a means, connected to the plurality of CLOCK/EN lines, and responsive to said command block information designating a specified peripheral device, for transmitting to said specified peripheral device both said resulting clock signal and enable signal on two of said CLOCK/EN lines connected to the same said Specified peripheral device, whereby a data block intended for that specified peripheral device designated by said command block and transmitted on said DATA_OUT line to all of said peripheral devices is loaded only into said specified peripheral device receiving said clock signal add said enable signal.

9. An autoload memory system, in a computer system, for initializing a plurality of peripheral devices connected to said computer system, said autoload memory system comprising:

a memory means for storage of both pre-loaded command blocks and pre-loaded data blocks simultaneously, wherein said data blocks consist of information to be transferred to said peripheral devices for initialization thereof, said memory means having means for transferring its stored contents on power-up or reset of the computer system, said memory means having an output;

an output register means having an input connected to said output of said memory means to receive said data blocks from said memory means and having a data output line DATA_OUT to provide said data blocks at least one bit at a time on said DATA_OUT line, said DATA_OUT line connecting in common with all of said peripheral devices allowing a data block intended for one specific peripheral device to also be received by all other peripheral devices simultaneously;

a plurality of CLOCK/EN lines connected to said plurality of peripheral devices;

a finite state means connected to said output of said memory means to receive directly from said memory means all of said command blocks, wherein said command blocks consist of bytes of information to be interpreted by said finite state means, including information designating a specified peripheral device as a destination for each data block, to facilitate transfer of said data blocks to said peripheral devices, said finite state means having means for interpreting said command blocks to perform specified functions including selecting a specific CLOCK/EN line for output of a clock signal used to transfer said data blocks on the DATA_OUT line;

a clock generator having oscillator means for generating a basic clock signal and frequency divider means for changing a frequency of said basic clock signal and for supplying a resulting clock signal to said finite state means; and said finite state means further comprising a means, connected to the plurality of CLOCK/EN lines, and responsive to said command block information designating a specified peripheral device, for transmitting to said specified peripheral device both said resulting clock signal and an enable signal on two of said CLOCK/EN lines connected to the same said specified peripheral device, whereby a data block intended for that specified peripheral device designated by said command block and transmitted on said DATA_OUT line to all of said peripheral devices is loaded only into said specified peripheral device receiving said clock signal and said enable signal, wherein said command blocks include a bit field designating whether an enable signal is transmitted, said enable signal remaining at a predetermined level throughout an output data transfer, and another bit field which specifies one of the plurality of CLOCK/EN lines for output of said enable signal.

10. An autoload memory system, in a computer system, for initializing a plurality of peripheral devices connected to said computer system, said autoload memory system comprising:

a memory means for storage of both pre-loaded command blocks and pre-loaded data blocks simultaneously, wherein said data blocks consist of information to be transferred to said peripheral devices for initialization thereof, said memory means having means for transferring its stored contents on power-up or reset of the computer system, said memory means having an output;

an output register means having an input connected to said output of said memory means to receive said data blocks from said memory means and having a data output line DATA_OUT to provide said data blocks at least one bit at a time on said DATA_OUT line, said DATA_OUT line connecting in common with all of said peripheral devices allowing a data block intended for one specific peripheral device to also be received by all other peripheral devices simultaneously;

plurality of CLOCK/EN lines connected to said plurality of peripheral devices;

a finite state means connected to said output of said memory means to receive directly from said memory means all of said command blocks, wherein said command blocks consist of bytes of information to be interpreted by said finite state means, including information designating a specified peripheral device as a destination for each data block, to facilitate transfer of said data blocks to said peripheral devices, said finite state means having means for interpreting said command blocks to perform specified functions including selecting a specific CLOCK/EN line for output of a clock signal used to transfer said data blocks on the DATA_OUT line;

a clock generator having oscillator means for generating a basic clock signal and frequency divider means for changing a frequency of said basic clock signal and for supplying a resulting clock signal to said finite state means; and said finite state means further comprising a means, connected to the plurality of CLOCK/EN lines, and responsive to said command block information designating a specified peripheral device, for transmitting to said specified peripheral device both said resulting clock signal and an enable signal on two of said CLOCK/EN lines connected to the same said specified peripheral device, whereby a data block intended for that specified peripheral device designated by said command block and transmitted on said DATA_OUT line to all of said peripheral devices is loaded only into said specified peripheral device receiving said clock signal and said enable signal, wherein said command blocks include a bit field redefining a function of said memory means to operate as a serial read/write memory upon completion of a power-on data transfer, said memory means being an electrically erasable memory, said bit field also redefining a function of said finite state means to include (1) serially receiving a memory address, a data block length, and a read/write command via a DATA_IN input line and a serial input register means, (2) interpreting and executing said read/write command using said memory address as a starting address for access to said memory means, (3) writing serially received data into said memory means during execution of a write command, (4) reading data from said memory means for serial output via a DATA_OUT output line during execution of a read command, (5) modifying said memory address to effect a data transfer at another memory address of said memory means, (6) comparing a data transfer length with a command block field specifying a data block length and terminating transfer of said data upon completion, and (7) remaining in a state of readiness to receive and execute additional read/write commands.

11. An autoload memory system as in claim 10 further including a guard address in said command blocks and means for comparing a received read/write memory address and for not executing the read/write command if the received address is less than the guard address.

12. An autoload memory system, in a computer system, for initializing a plurality of peripheral devices connected to said computer system, said autoload memory system comprising:

a memory means for storage of both pre-loaded command blocks and pre-loaded data blocks simultaneously, wherein said data blocks consist of information to be transferred to said peripheral devices for initialization thereof, said memory means being an electrically erasable memory, said memory means having means for transferring its stored contents on power-up or reset of the computer system, said memory means having an output;

an output register means having an input connected to said output of said memory means to receive said data blocks from said memory means and having a data output line DATA_OUT to provide said data blocks at least one bit at a time on said DATA_OUT line, said DATA_OUT line connecting in common with all of said peripheral devices allowing a data block intended for one specific peripheral device to also be received by all other peripheral devices simultaneously;

a plurality of CLOCK/EN lines connected to said plurality of peripheral devices;

a finite state means connected to said output of said memory means to receive directly from said memory means all of said command blocks, wherein said command blocks consist of bytes of information to be interpreted by said finite state means, including information designating a specified peripheral device as a destination for each data block, to facilitate transfer of said data blocks to said peripheral devices, said finite state means having means for interpreting said command blocks to perform specified functions including selecting a specific CLOCK/EN line for output of a clock signal used to transfer said data blocks on the DATA_OUT line;

a clock generator having oscillator means for generating a basic clock signal and frequency divider means for changing a frequency of said basic clock signal and for supplying a resulting clock signal to said finite state means;

said finite state means further comprising a means, connected to the plurality of CLOCK/EN lines, and responsive to said command block information designating a specified peripheral device, for transmitting to said specified peripheral device both said resulting clock signal and an enable signal on two of said CLOCK/EN lines connected to the same said specified peripheral device, whereby a data block intended for that specified peripheral device designated by said command block and transmitted on said DATA_OUT line to all of said peripheral devices is loaded only into said specified peripheral device receiving said clock signal and said enable signal, and a serial input register means connected to receive serial information via a DATA_IN input line for transferring its register contents to said memory means for storage or to said finite state means for interpretation and execution as a command.

13. An autoload memory system, in a computer system, for initializing a plurality of peripheral devices connected to said computer system, said autoload memory system comprising:

a memory means for storage of both pre-loaded command blocks and pre-loaded data blocks simultaneously, wherein said data blocks consist of information to be transferred to said peripheral devices for initialization thereof, said memory means having means for transferring its stored contents on power-up or reset of the computer system, said memory means having an output;

an output register means having an input connected to said output of said memory means to receive said data blocks from said memory means and having a data output line DATA_OUT to provide said data blocks at least one bit at a time on said DATA_OUT line, said DATA_OUT line connecting in common with all of said peripheral devices allowing a data block intended for one specific peripheral device to also be received by all other peripheral devices simultaneously;

a plurality of CLOCK/EN lines connected to said plurality of peripheral devices;

a finite state means connected to said output of said memory means to receive directly from said memory means all of said command blocks, wherein said command blocks consist of bytes of information to be interpreted by said finite state means, including information designating a specified peripheral device as a destination for each data block, to facilitate transfer of said data blocks to said peripheral devices, said finite state means having means for interpreting said command blocks to perform specified functions including selecting a specific CLOCK/EN line for output of a clock signal used to transfer said data blocks on the DATA_OUT line;

a clock generator having oscillator means for generating a basic clock signal and frequency divider means for changing a frequency of said basic clock signal and for supplying a resulting clock signal to said finite state means; and said finite state means further comprising a means, connected to the plurality of CLOCK/EN lines, and responsive to said command block information designating a specified peripheral device, for transmitting to said specified peripheral device both said resulting clock signal and an enable signal on two of said CLOCK/EN lines connected to the same said specified peripheral device, whereby a data block intended for that specified peripheral device designated by said command block and transmitted on said DATA_OUT line to all of said peripheral devices is loaded only into said specified peripheral device receiving said clock signal and said enable signal, said command blocks including a bit field designating whether upon completion of all data transfers said autoload memory system shuts down or remains active.

14. An autoload memory system, in a computer systems, for initializing a plurality of peripheral devices connected to said computer system, said autoload memory system comprising:

a memory means for storage of both pre-loaded command blocks and pre-loaded data blocks simultaneously, wherein said data blocks consist of information to be transferred to said peripheral devices for initialization thereof, said memory means having means for transferring its stored contents on power-up or reset of the computer system, said memory means having an output;

an output register means having an input connected to said output of said memory means to receive said data blocks from said memory means and having a data output line DATA_OUT to provide said data blocks at least one bit at a time on said DATA_OUT line, said DATA_OUT line connecting in common with all of said peripheral devices allowing a data block intended for one specific peripheral device to also be received by all other peripheral devices simultaneously;

a plurality of CLOCK/EN lines connected to said plurality of peripheral devices;

a finite state means connected to said output of said memory means to receive directly from said memory means all of said command blocks, wherein said command blocks consist of bytes of information to be interpreted by said finite state means, including information designating a specified peripheral device as a destination for each data block, to facilitate transfer of said data blocks to said peripheral devices, said finite state means having means for interpreting said command blocks to perform specified functions including selecting a specific CLOCK/EN line for output of a clock signal used to transfer said data blocks on the DATA_OUT line;

a clock generator having oscillator means for generating a basic clock signal and frequency divider means for changing a frequency of said basic clock signal and for supplying a resulting clock signal to said finite state means;

said finite state means further comprising a means, connected to the plurality of CLOCK/EN lines, and responsive to said command block information designating a specified peripheral device, for transmitting to said specified peripheral device both said resulting clock signal and an enable signal on two of said CLOCK/EN lines connected to the same said specified peripheral device, whereby a data block intended for that specified peripheral device designated by said command block and transmitted on said DATA_OUT line to all of said peripheral devices is loaded only into said specified peripheral device receiving said clock signal and said enable signal; and said finite state means further including (a) memory address counter means for providing a memory address to access commands and data from selected command and data blocks stored in said memory means, (b) data transfer length counter means for counting a selected number of bytes of data to be output from said memory means, and (c) means for receiving a plurality of strap signals on STRAP-IN lines, then carrying out a logical AND operation on a logic level associated with each of the strap signals and a different bit of a specified command field, then loading a resulting logical product into predetermined bit positions of the data transfer length counter means and loading zeros into remaining bit positions of the data transfer length counter means, then decrementing the loaded contents of said data transfer length counter means until the decremented contents are equal to a predetermined number, and incrementing an address in the memory address counter means each time the contents of the data transfer length counter means is being decremented.

15. An autoload memory system, in a computer system, for initializing a plurality of peripheral devices connected to said computer system, said autoload memory system comprising:

a memory means for storage of both pre-loaded command blocks and pre-loaded data blocks simultaneously, wherein said data blocks consist of information to be transferred to said peripheral devices for initialization thereof, said memory means having means for transferring its stored contents on power-up or reset of the computer system, said memory means having an output;

an output register means having an input connected to said output of said memory means to receive said data blocks from said memory means and having a data output line DATA_OUT to provide said data blocks at least one bit at a time on said DATA_OUT line, said DATA_OUT line connecting in common with all of said peripheral devices allowing a data block intended for one specific peripheral device to also be received by all other peripheral devices simultaneously;

a plurality of CLOCK/EN lines connected to said plurality of peripheral devices;

a finite state means connected to said output of said memory means to receive directly from said memory means all of said command blocks, wherein said command blocks consist of bytes of information to be interpreted by said finite state means, including information designating a specified peripheral device as a destination for each data block, to facilitate transfer of said data blocks to said peripheral devices, said finite state means having means for interpreting said command blocks to perform specified functions including selecting a specific CLOCK/EN line for output of a clock signal used to transfer said data blocks on the DATA_OUT line;

a clock generator having oscillator means for generating a basic clock signal and frequency divider means for changing a frequency of said basic clock signal and for supplying a resulting clock signal to said finite state means;

said finite state means further comprising a means, connected to the plurality of CLOCK/EN lines, and responsive to said command block information designating a specified peripheral device, for transmitting to said specified peripheral device both said resulting clock signal and an enable signal on two of said CLOCK/EN lines connected to the same said specified peripheral device, whereby a data block intended for that specified peripheral device designated by said command block and transmitted on said DATA_OUT line to all of said peripheral devices is loaded only into said specified peripheral device receiving said clock signal and said enable signal, wherein at least one command block includes a WAIT command, the WAIT command initializing a sequence of operations including loading command bytes representing a number from the memory means into a data transfer length counter means of said finite state means, then decrementing the number in the data transfer counter means until the number is equal to a predetermined second number, then incrementing the contents of a memory address counter of said finite state means and fetching a next command.

16. An autoload memory system, in a computer system, for initializing a plurality of peripheral devices connected to said computer system, said autoload memory system comprising:

- means for activation of the memory system at power on or system reset, the activation means including a RESET-IN line for receiving a reset signal, and a RESET-OUT line for outputting a signal which will be asserted when a signal on the RESET-IN line is asserted or when a busy control signal is asserted;

- memory means being organized as a plurality of addressable locations, each addressable location storing one byte of information, the memory means having a set of memory address lines for receiving a location address, and having a set of memory output lines for outputting said byte of information stored at an addressed location, the memory means providing storage for at least one command block and at least one data block, said at least one data block consisting of bytes of data to be transferred to said peripheral devices for initialization thereof, bytes of information in said at lest one command block consisting of commands for facilitating transfer of said bytes of data to said peripheral devices;

- a data output register being connected to receive a byte of data from the memory output lines, the byte of data being accepted when a load control signal is asserted, the contents of the register being output at least one bit at a time on at least one DATA_OUT line when a shift control signal is asserted;

- memory address counter means having outputs connected to provide address signals on the memory address lines, the memory address counter means being responsive to an initialize control signal whereby an address stored in said memory address counter means is preset to an initial address, and to an increment control signal which causes the memory address counter means to increment the address stored therein from a present address to a next address;

- data transfer length counter means for counting the number of bits of data output by the data output register, the data transfer length counter means being organized into a plurality of byte wide sections, each byte wide section being connected to receive a byte of information in a command block from the memory output lines and being responsive to a specific byte_load control signal for loading said byte of information into that section, the plurality of byte wide sections being organized to function together as a counter whose loaded bytes of information together represent an initial count, which is decremented from a present count to a next count when a decrement control signal is asserted, the data transfer length counter means providing a done signal which is asserted when the decremented count is equal to a predetermined count;

- command register means connected to receive commands from the memory output lines when a fetch control signal is asserted, predetermined subfields of the command register means being connected to a decoding means for decoding command bits of the subfields to produce a plurality of command decode signals, the command register means being responsive to a preset control signal for presetting the contents of the command register means to a predetermined code;

- a clock generator for providing a clock signal, the clock generator having a divider for increasing a duty cycle length and pulse width of a data transfer clock signal which is output on one of a plurality of CLOCK lines connected to said plurality peripheral devices;

- a sequential state machine connected to receive the reset signal, the command decode signals, the done signal, and the clock signal and to produce therefrom all the control signals in proper sequences to fetch and execute the commands and to output each data block to a target peripheral device.

17. The autoload memory system of claim 16 further including a plurality of programmable I/O pads respectively connected to said DATA_OUT line and said CLOCK line, a command including a subfield being decodable to select a programmable I/O pad as an input line or an output line.

18. The autoload memory system of claim 16 wherein the clock generator further includes programmable means for receiving an external data transfer clock signal on a CLOCK_IN line and providing this clock signal for use in serially outputting data.

19. The autoload memory system of claim 16 further including means for receiving a control input signal on a CONTROL_IN line, an asserted level of the control input signal causes said sequential state machine to temporarily suspend operation until said control input signal returns to a non-asserted level.

20. The autoload memory system of claim 19 wherein the asserted level of the control input signal disables said DATA_OUT line and said CLOCK line.

21. The autoload memory system of claim 19 wherein a non-asserted level of the control signal causes the sequential state machine to suspend operation, and an asserted level of the control signal causes the sequential state machine to resume operation.

22. The autoload memory system of claim 16 further including means for receiving a plurality of strap signals on STRAP-IN lines, then carrying out a logical AND operation on a logic level associated with each of the strap signals and a different bit of a specified command field, then loading a resulting logical product into predetermined bit positions of the data transfer length counter means and loading zeros into remaining bit positions of the data transfer length counter means, then decrementing the loaded contents of said data transfer length counter means until the decremented contents are equal to a predetermined number, and incrementing an address in the memory address counter means each time the contents of the data transfer length counter means is being decremented.

23. The autoload memory system of claim 16 wherein at least one command block includes a WAIT command, the WAIT command initiating a sequence of operations including loading command bytes representing a number from the memory means into the data transfer length counter means, then decrementing the number in the data transfer length counter means until the the decremented number is equal to a predetermined second number, then incrementing the contents of the memory address counter means and fetching a next command.

* * * * *